(12) United States Patent
Alabsi

(10) Patent No.: US 10,616,034 B1
(45) Date of Patent: *Apr. 7, 2020

(54) TIME-BASED COMPUTING INSTANCES

(71) Applicant: Amazon Technologies, Inc., Reno, NV (US)

(72) Inventor: Mohammed Samir Alabsi, Mercer Island, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/384,400

(22) Filed: Apr. 15, 2019

Related U.S. Application Data

(63) Continuation of application No. 13/926,231, filed on Jun. 25, 2013, now Pat. No. 10,284,415.

(51) Int. Cl.
*H04L 29/06* (2006.01)
*H04L 29/08* (2006.01)

(52) U.S. Cl.
CPC .............. *H04L 29/08153* (2013.01)

(58) Field of Classification Search
CPC ................................. H04L 29/08153
See application file for complete search history.

(56) References Cited

U.S. PATENT DOCUMENTS 8,996,019 B2  3/2015  Eriksson et al.
2012/0302272 A1  11/2012  Hakola et al.

*Primary Examiner* — Adnan M Mirza
(74) *Attorney, Agent, or Firm* — BakerHostetler

(57) ABSTRACT

In a computing environment, a request for computing resources is received by an entity. A quantity of resource slots sufficient to fulfill the request is determined and associated with the entity during a portion of a recurring time period. The resource slots can be associated with other entities during other portions of the recurring time period.

20 Claims, 12 Drawing Sheets

TIME-BASED COMPUTING INSTANCES

CROSS-REFERENCE

The present application is a continuation of U.S. patent application Ser. No. 13/926,231, entitled "TIME-BASED COMPUTING INSTANCES", filed Jun. 25, 2013, the contents of which are incorporated herein by reference in its entirety.

BACKGROUND

A data center is a facility that houses computer systems and various networking, storage and other related components. Data centers may, for example, provide computing services to businesses and individuals as a remote computing service or to provide "software as a service" (e.g., cloud computing). To facilitate utilization of data center resources, virtualization technologies may allow a single physical computing machine to host one or more instances of virtual machines that appear and operate as independent computer machines to a connected computer user. With virtualization, the single physical computing device can create, maintain or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage and/or other network-accessible resources may allow customers to reserve or purchase access to resources in various resource acquisition modes. The computing resource provider may provide facilities for customers to select and launch the desired computing resources, deploy application components to the computing resources and maintain an application executing in the environment. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure.

DETAILED DESCRIPTION

A service provider, such as an entity that operates a provider network, may offer computing resources such as a reserved instance and a spot instance. A reserved instance may provide a customer with the ability to reserve a number of a specific type and configuration of instance for a fixed term, such as one year or three years. A spot instance may refer to an allocation of a virtual machine instance using a spot-price policy, where the customer may specify the maximum price per unit time that the customer is willing to pay for the instance. If the customer's maximum price exceeds a dynamic spot price determined at least in part by supply and demand, then the instance may be provided to the customer. Other types of instances may be offered by the provider network. Many customers who purchase instances of various types may purchase a quantity and type of instance in order to provide sufficient capacity to support all anticipated computing usage. For example, a customer with a global presence may purchase a sufficient number of reserved instances in all availability zones where the customer has a market. Furthermore, the customer may determine the most active time periods in each availability zone and account for peak usage in each availability zone when purchasing capacity. One drawback to this approach is that if the customer acquires enough instances to account for peak usage, the customer may have excess capacity during off-peak time periods when computing usage is lower compared to peak time periods.

In various embodiments described further in this disclosure, customers may be provided an option to purchase time-based portions of an instance. For example, a customer may purchase less than full time access to an instance, or a time-based "slice" of an instance. Furthermore, customers may purchase such time-based slices at different time periods in different availability zones (or any other geographic area) to account for different peak usage patterns in different time zones. Thus, a customer's purchased or leased computing capacity may "migrate" as peak usage moves across different time zones. In this way, a customer need not purchase instances to account for peak usage when the purchased instances may sit idle during non-peak usage times. Further details will now be described.

Figure 1:
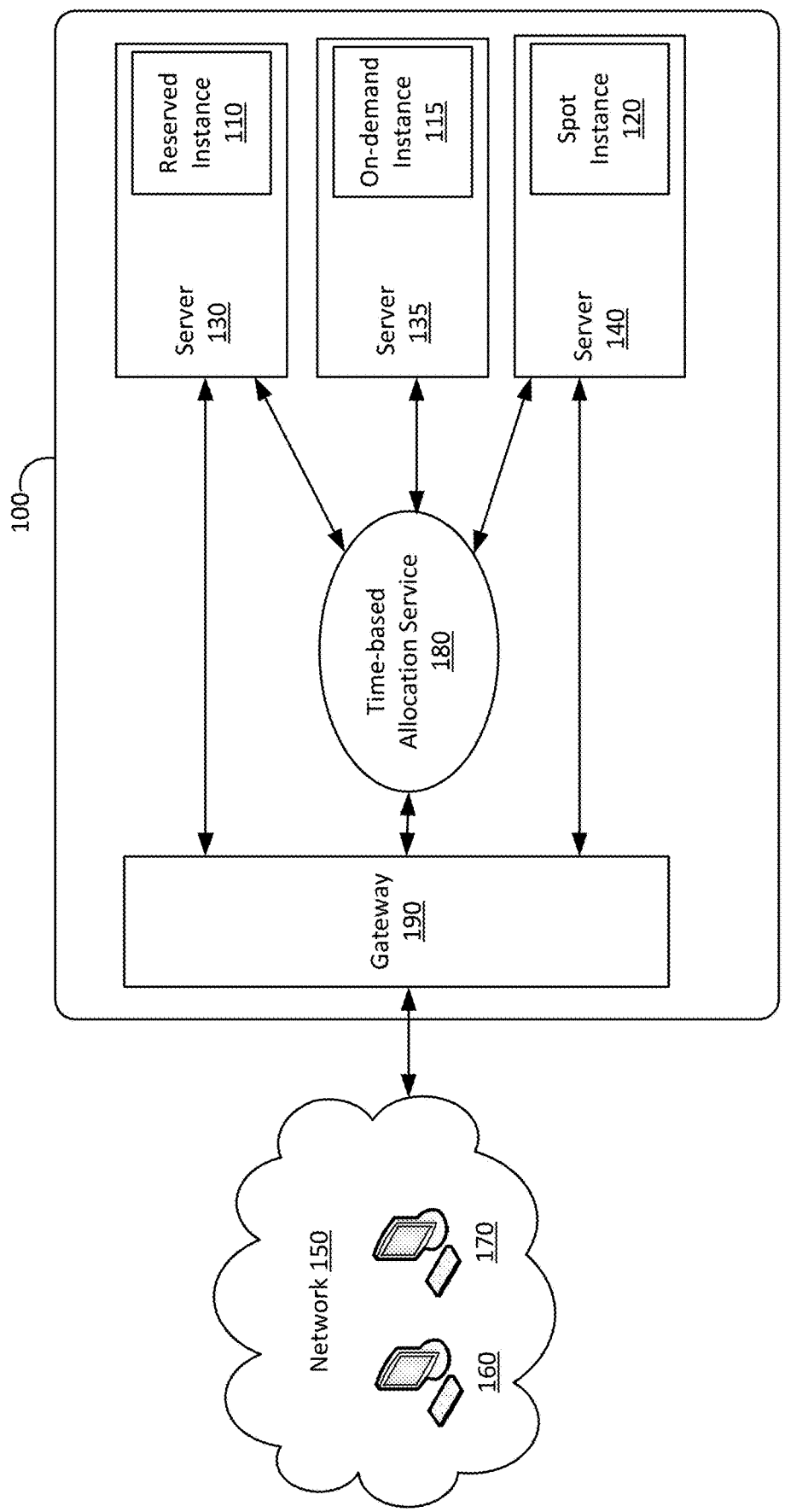
FIG. 1 is a diagram illustrating a mechanism for time-based instances in accordance with the present disclosure.

FIG. 1 is a diagram illustrating a system 100 including a framework for time-based instances in accordance with the present disclosure. In FIG. 1, system 100 may include a reserved virtual machine instance 110, an on-demand virtual machine instance 115 and a spot virtual machine instance 120 that may execute, for example, on one or more server computers 130, 135 and 140, respectively. It will be appreciated that some embodiments may involve additional virtual machine instances of various types that may be instantiated on additional server computers.

FIG. 1 also illustrates a public network 150 that may include one or more computers, such as computers 160 and 170. According to one embodiment, instances 110, 115 and 120 may be configured to provide computing services to a computer user (not shown) of public network 150 via gateway 190 and computers 160 and 170. For example, reserved virtual machine instance 110 may provide a set of remote access enterprise applications to a group of users who may, for example, be employees of an enterprise customer.

A user at computer 160 or 170 may send a request to a time-based allocation service 180 for a time-based instance or an instance "slice." In some embodiments, a request may be received directly from the user at computer 160 or 170. In response to receipt of a request, time-based allocation service 180 may log the request and provide updates as to the status of the request. The time-based allocation service 180 may communicate with other services to facilitate: (1) processing of the request, (2) reserving capacity to fulfill the request and (3) allocation of resources necessary to fulfill the request. The time-based allocation service 180 may, for example, provide an interface for facilitating submission of the time-based request. The time-based allocation service 180 may further provide an interface for viewing the status of the request and modifying or cancelling the request.

Various aspects of the disclosure are now described with regard to certain examples and embodiments, which are intended to illustrate but not to limit the disclosure. It should be appreciated that the subject matter presented herein may be implemented as a computer process, a computer-controlled apparatus or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity such as a company or organization to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages such as Ruby, Perl, Python, C, C++ and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 2:
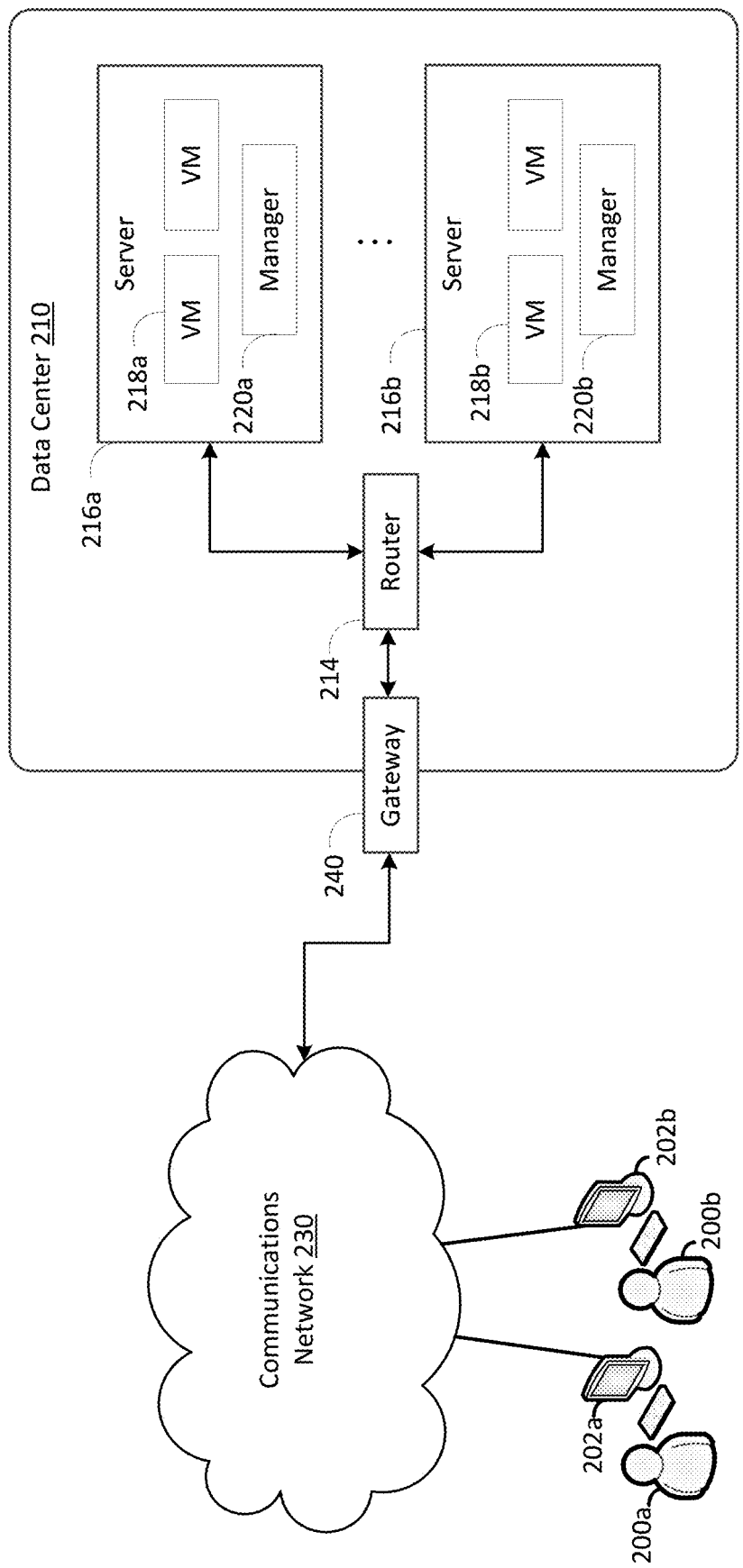
FIG. 2 is a diagram illustrating an example computing system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources and the like. Each type of computing resource may be general purpose or may be available in a number of specific configurations. For example, data processing resources may be available as virtual machine instances. The instances may be configured to execute applications, including Web servers, application servers, media servers, database servers and the like. Data storage resources may include file storage devices, block storage devices and the like.

Each type or configuration of computing resource may be available in different sizes, such as large resources, consisting of many processors, large amounts of memory and/or large storage capacity, and small resources consisting of fewer processors, smaller amounts of memory and/or smaller storage capacity. Customers may choose to allocate a number of small processing resources as Web servers and/or one large processing resource as a database server, for example.

Data center 210 may include servers 216a and 216b (which may be referred herein singularly as "a server 216" or in the plural as "the servers 216") that provide computing resources available as virtual machine instances 218a and 218b (which may be referred herein singularly as "a virtual machine instance 218" or in the plural as "the virtual machine instances 218"). The virtual machine instances 218 may be configured to execute applications, including Web servers, application servers, media servers, database servers and the like. Other resources that may be provided include data storage resources (not shown) and may include file storage devices, block storage devices and the like.

The availability of virtualization technologies for computing hardware has provided benefits for providing large scale computing resources for customers and allowing computing resources to be efficiently and securely shared between multiple customers. For example, virtualization technologies such as those provided by VMware or other virtualization systems may allow a physical computing device to be shared among multiple users by providing each user with one or more virtual machine instances hosted by the physical computing device.

A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communications network 230 may provide access to computers 202. Computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

Computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b (which may be referred herein singularly as "a server 216" or in the plural as "the servers 216") shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on servers 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts and/or other types of code to be executed in new instances, provide cache warming logic specifying how an application cache should be prepared and other types of information. The deployment component utilizes the customer-provided configuration and cache warming logic to launch, configure and prime new instances of computing resources.

Figure 3:
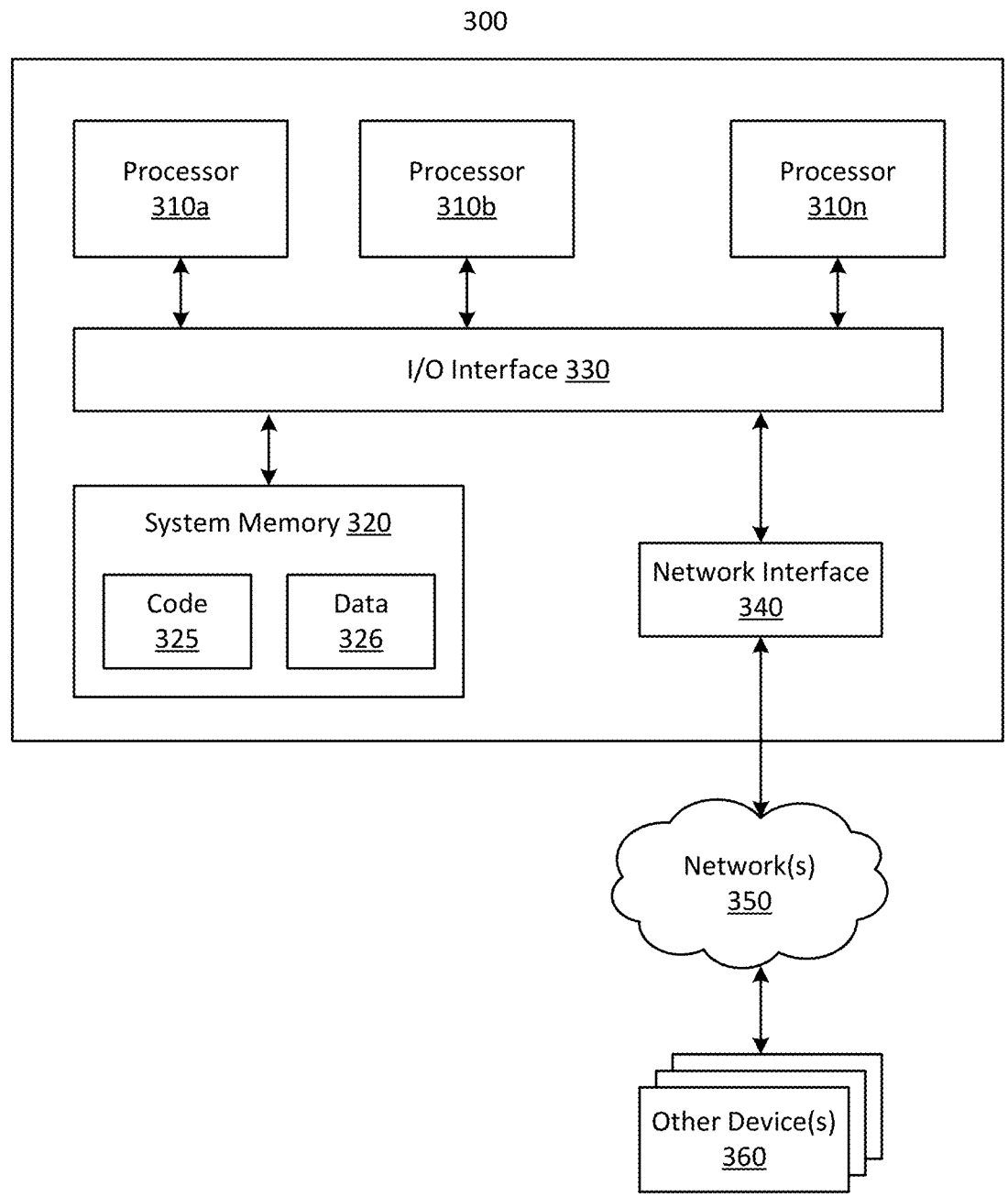
FIG. 3 is a diagram illustrating an example computing system that may be used in some embodiments.

In at least some embodiments, a server that implements a portion or all of one or more of the technologies described herein, including the techniques to implement the functionality of a time-based allocation service 180 may include a general purpose computer system that includes or is configured to access one or more computer-accessible media. FIG. 3 illustrates such a general purpose computing device 300. In the illustrated embodiment, computing device 300 includes one or more processors 310a, 310b and/or 310n (which may be referred herein singularly as "a processor 310" or in the plural as "the processors 310") coupled to a system memory 320 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight or another suitable number). Processors 310 may be any suitable processors capable of executing instructions. For example, in various embodiments, processors 310 may be general purpose or embedded processors implementing any of a variety of instruction set architectures (ISAs), such as the x86, PowerPC, SPARC, or MIPS ISAs or any other suitable ISA. In multiprocessor systems, each of processors 310 may commonly, but not necessarily, implement the same ISA.

System memory 320 may be configured to store instructions and data accessible by processor(s) 310. In various embodiments, system memory 320 may be implemented using any suitable memory technology, such as static random access memory (SRAM), synchronous dynamic RAM (SDRAM), nonvolatile/Flash-type memory or any other type of memory. In the illustrated embodiment, program instructions and data implementing one or more desired functions, such as those methods, techniques and data described above, are shown stored within system memory 320 as code 325 and data 326.

In one embodiment, I/O interface 330 may be configured to coordinate I/O traffic between processor 310, system memory 320 and any peripheral devices in the device, including network interface 340 or other peripheral interfaces. In some embodiments, I/O interface 330 may perform any necessary protocol, timing or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computing device 300 and other device or devices 360 attached to a network or network(s) 350, such as other computer systems or devices as illustrated in FIGS. 1 through 3, for example. In various embodiments, network interface 340 may support communication via any suitable wired or wireless general data networks, such as types of Ethernet networks, for example. Additionally, network interface 340 may support communication via telecommunications/telephony networks such as analog voice networks or digital fiber communications networks, via storage area networks such as Fibre Channel SANs or via any other suitable type of network and/or protocol.

In some embodiments, system memory 320 may be one embodiment of a computer-accessible medium configured to store program instructions and data as described above for FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 300 via I/O interface 330. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 300 as system memory 320 or another type of memory. Further, a computer-accessible medium may include transmission media or signals such as electrical, electromagnetic or digital signals, conveyed via a communication medium such as a network and/or a wireless link, such as may be implemented via network interface 340. Portions or all of multiple computing devices such as those illustrated in FIG. 3 may be used to implement the described functionality in various embodiments; for example, software components running on a variety of different devices and servers may collaborate to provide the functionality. In some embodiments, portions of the described functionality may be implemented using storage devices, network devices or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages such as Ruby, Perl, Python, C, C++ and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors and with various installed software applications, runtimes and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type and/or configuration of computing resource in a specific availability zone for a longer period than desired. If the technical architecture or needs of the application change, the customer may not be able to realize a return on their investment in the reserved instances.

Operators of such provider networks may in some instances implement a flexible set of resource reservation, control and access interfaces for their clients. For example, a resource manager of the provider network may implement a programmatic resource reservation interface (e.g., via a Web site or a set of Web pages) that allows clients to learn about, select, purchase access to and/or reserve resource instances. In some embodiments discussed below where an entity such as a resource manager or a pricing optimizer is described as implementing one or more programmatic interfaces, such as a Web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog, provide details and specifications of the different types or sizes of resources supported, the different reservation types or modes supported, pricing models and so on.

The provider network may support several different purchasing modes (which may also be referred to herein as reservation modes) corresponding to some of the instance types described above. For example, the provider network may support long-term reservations, on-demand resource allocations or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 4:
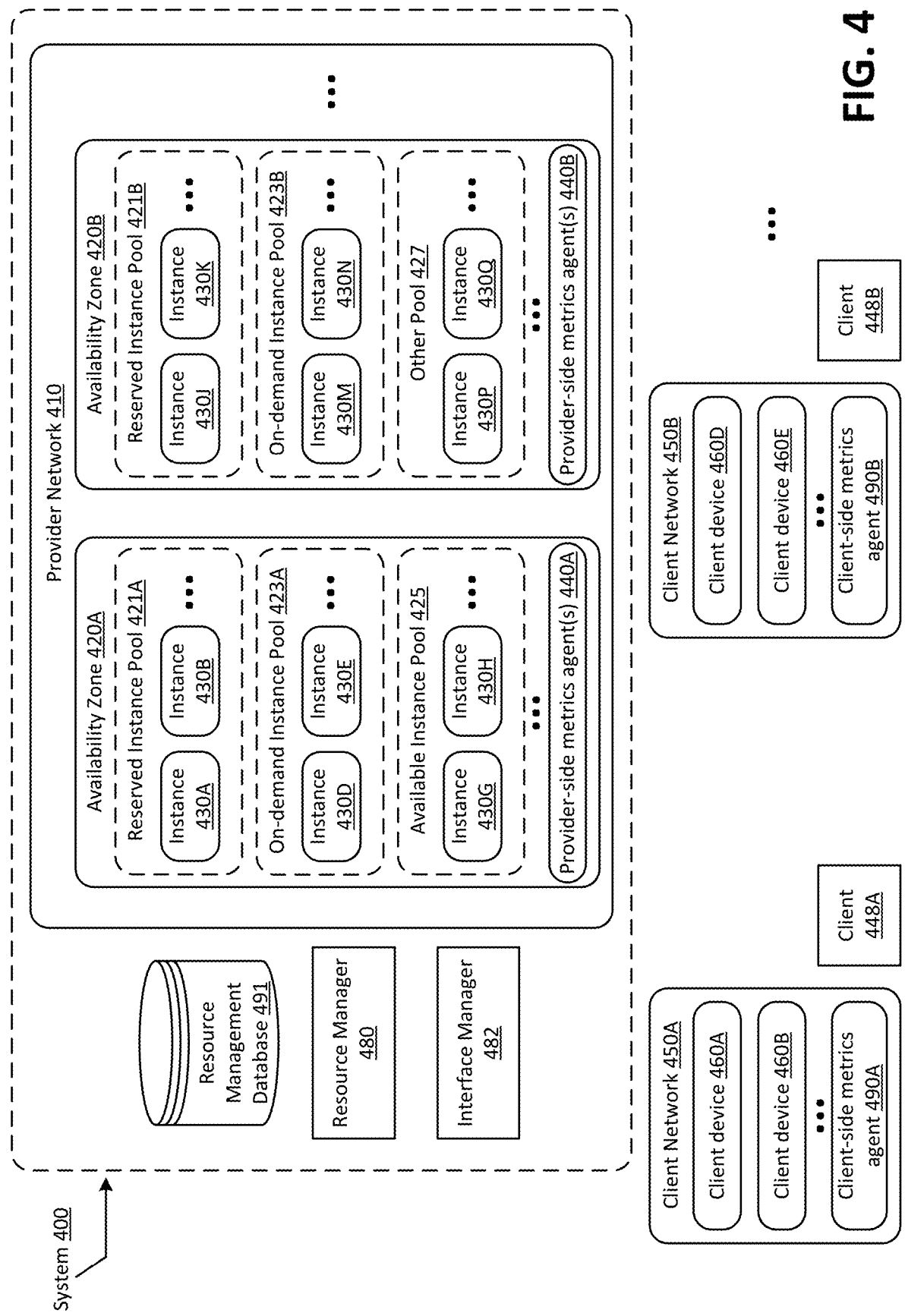
FIG. 4 is a diagram illustrating a system for time-based instances in accordance with the present disclosure.

FIG. 4 illustrates an example system environment for providing instances, according to at least some embodiments. The system 400 may include a provider network 410 comprising a plurality of resource instances 430 (which may be referred herein singularly as "a resource instance 430" or in the plural as "the resource instances 430"), such as instances 430A, 430B, 430D, 430E, 430G and 430H in one availability zone 420A and instances 430J, 430K, 430M, 430N, 430P and 430Q in a different availability zone 420B. The various resource instances 430 in the availability zones 420A and 420B (which may be referred herein singularly as "an availability zone 420" or in the plural as "the availability zones 420") may be reserved and/or allocated for use by clients (or potential clients), such as client 448A and 448B (which may be referred herein singularly as "a client 448" or in the plural as "the clients 448"). In the illustrated embodiment, system 400 includes a resource manager 480 and an interface manager 482. As noted earlier, in some embodiments the functionality of the interface manager 482 may be implemented by a subcomponent of the resource manager 480.

The interface manager 482 may in some embodiments implement one or more programmatic interfaces allowing clients 448 to search for, browse, reserve and acquire instances 430 to obtain various types of services, e.g., to run and/or access various applications. In the illustrated embodiment, at a given point in time, some or all of the instances 430 may be assigned to instance pools, such as reserved instance pools 421A or 421B, on-demand instance pools 423A or 423B, available instance pool 425 or other pools such as other pool 427.

In some embodiments a given pool, such as available instance pool 425, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 430 illustrated in FIG. 4 are shown as belonging to availability zones 420, in other embodiments the provider network 410 may be organized differently, e.g., in some embodiments availability zones 420 may not be implemented. Availability zones 420 may be grouped into geographic regions (not shown in FIG. 4) in some embodiments. Instance pools may be implemented within availability zones in some implementations (e.g., each availability zone may have its own reserved instance pool); while in other implementations an instance pool or sub-pool may span multiple availability zones.

Figure 5:
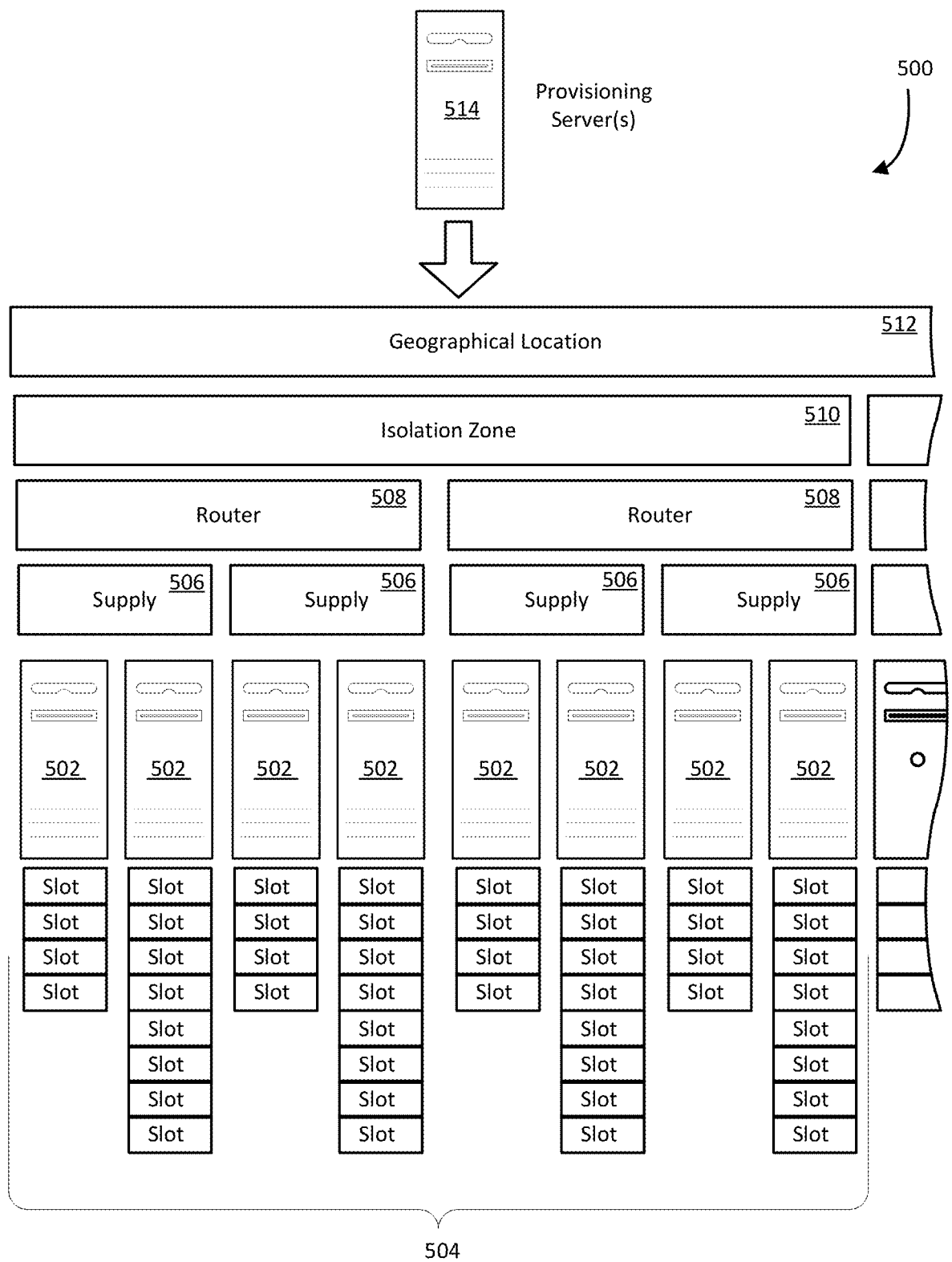
FIG. 5 is a diagram illustrating a mechanism for time-based instances in accordance with the present disclosure.

In some embodiments, such as in FIG. 5, a data center 500 may be viewed as a collection of shared computing resources and/or shared infrastructure. For example, as shown in FIG. 5, a data center 500 may include virtual machine slots 504, physical hosts 502, power supplies 506, routers 508, isolation zones 510 and geographical locations 512. A virtual machine slot 504 may be referred to as a slot or as a resource slot. A physical host 502 may be shared by multiple virtual machine slots 504, each slot 504 being capable of hosting a virtual machine, such as a guest domain. Multiple physical hosts 502 may share a power supply 506, such as a power supply 506 provided on a server rack. A router 508 may service multiple physical hosts 502 across several power supplies 506 to route network traffic. An isolation zone 510 may service many routers 508, the isolation zone 510 being a group of computing resources that may be serviced by redundant resources such as a backup generator. Multiple isolation zones 510 may reside at a geographical location 512, such as a data center 500. A provisioning server 514 may include a memory and processor configured with instructions to analyze user data and rank available implementation resources using determined roles and shared resources/infrastructure in the calculation. The provisioning server 514 may also manage workflows for provisioning and deprovisioning computing resources as well as detecting health and/or failure of computing resources.

A provisioning server 514 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 502 that shares a router 508 with a second system may be more proximate to the second system than to a third system only sharing an isolation zone 510. Depending on an application, it may be desirable to keep the distance low to increase throughput or high to increase durability. In another embodiment, the distance may be defined in terms of unshared resources. For example, two slots 504 sharing a router 508 may have a distance of a physical host 502, and a power supply 506. Each difference in resources may be weighted differently in a distance calculation.

A placement calculation may also be used when selecting a prepared resource to transfer to a client account. In one embodiment, a client requests a virtual machine having an operating system. The provisioning server 514 may determine that the request may be satisfied with a staged volume in a slot 504. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 514 may determine that a placement near other existing volumes is desirable for latency concerns. Therefore, the decision may find that sharing a router 508 is desirable but sharing a supply 506 and physical host 502 is undesirable. A volume in the pool may then be selected that matches these attributes and placed preferably on a same router 508 as the other volumes but not the same physical host 502 or power supply 506. In other examples of placement decisions, such as those relating to a database shard, sharing of infrastructure may be less desirable and a volume may be selected that has less infrastructure in common with other related volumes.

In some embodiments, a pricing optimizer (aspects of whose functionality may be exposed to customers via programmatic interfaces such as Web pages or a Web site) may be operable to obtain resource usage records of a customer from one or more usage data sources, and determine a recommended course of action for the customer with respect to future resource instance reservations and/or acquisitions based on the usage records and/or other pieces of information. For example, in making the recommendation, the pricing optimizer may take into account data about the customer's resource usage during earlier time periods (e.g., during the last month or the last three months) as indicated by the usage records, the pricing policies and/or current prices of different types of resources in the various resource pools and one or more optimization goals of the customer. Several different types of customer optimization goals may be taken into account in various embodiments, including, for example, customer budget limits and/or goals for a target number of available resource instances that the customer wishes to acquire. Using these various types of information, the pricing optimizer may determine a recommended number and/or types of resource instances that the customer should access over some future term and provide a notification of the recommendation to the customer.

Various types of usage data sources from which the pricing optimizer obtains usage data to develop its recommendations may be employed in different embodiments. In some embodiments, where, for example, a customer already uses some set of resource instances of the provider network, provider-side metrics agents deployed at various entities (such as resource instances, network devices and the like) within the provider network may serve as usage data sources for the pricing optimizer. The types of usage information collected for a given resource or instance may include, for example, uptime (i.e., the amount of time a resource instance was active or booted up), CPU utilization, memory utilization, I/O rates, I/O device utilization, network traffic rates, network device utilization, the operating system in use, the hypervisor in use, various details of the software stack in use such as application server type and version and so on, depending on the type of resource. In other embodiments, at least a portion of the usage records may be collected from customer premises or customer networks outside the provider network. For example, in one such embodiment, an entity of the provider network may allow prospective (or current) customers to download installable customer-side metrics agents, which may then be deployed to collect usage statistics from various devices (such as servers, storage devices or network devices) within the customer's networks. The collected usage data may then be transmitted back for analysis by the pricing optimizer, which may then be able to generate recommendations for the types and number of resource instances the customer should acquire, e.g., to allow the customer to utilize the provider network's resources instead of at least some portion of the customer-side equipment.

The pricing optimizer may in one embodiment also provide recommendations for the target availability zone or zones in which a client's instances should be located. For example, the client's resource usage records may include Internet Protocol (IP) address information that allows the pricing optimizer to determine the sources and destinations of at least some of the client's network traffic, which may be useful in identifying the appropriate availability zones.

In some embodiments an interface manager (which, as noted earlier, may be incorporated within the pricing optimizer and/or a resource manager or may be external to both the pricing optimizer and resource manager) may implement a programmatic interface, which may, for example, be exposed as one or more Web pages, allowing customers to indicate optimization goals that the pricing optimizer should use when developing recommendations. Using such an interface, a customer may in one implementation indicate a resource usage budget limit, and the pricing optimizer may attempt to determine recommendations that meet the budget limit. In another scenario, a customer may indicate an instance availability count goal in some embodiments. In environments where different interruptibility settings are supported, e.g., where access to some resource instances may be revoked based on threshold conditions being reached, the pricing optimizer may also receive indications of the interruptibility preferences of a customer and use those preferences in making its recommendations. Various combinations of different types of customer optimization goals may be used in different embodiments. In one implementation the recommendations may include performance capacity ratings for some or all of the resource instances that the customer is being advised to acquire.

In some embodiments a programmatic interface implemented for the customer may allow the customer to specify various "what if" scenarios (such as anticipated or speculative resource usage metrics), and the pricing optimizer may provide recommendations based on these what if scenarios. In one embodiment a customer may be allowed to use a programmatic interface to opt in to receive notifications if the pricing optimizer is able to find a way for the customer to save a specified amount, and the optimizer may notify the customer accordingly if the desired savings can be implemented. In another embodiment programmatic interfaces (such as an API) may be implemented to allow third parties, such as network service companies or other intermediaries, to utilize the functionality of the pricing optimizer—e.g., to provide usage data and/or pricing/budgeting goals to the optimizer and receive corresponding recommendations. Third parties may use such facilities to help guide their own customers and/or to build their own resource management interfaces to extend the core functions supported by the pricing optimizer. Various other types of services and functions may be provided by the pricing optimizer in different embodiments—e.g., the pricing optimizer may suggest instance downgrades (e.g., informing a customer that they may request a less powerful resource instance than the one they are currently paying for) based on the customer's resource usage statistics, suggest a reservation resale (e.g., recommend to a customer that a long-term reservation should be listed on a reservation resale marketplace) and so on. In one embodiment, the pricing optimizer may be used to provide recommendations for reservations or allocations of execution units (such as CPU-minutes CPU-hours, floating point operations (FLOPs) and the like) instead of, or in addition to, reservations or allocations of entire resource instances.

According to one embodiment, a customer may opt in to allow a resource manager to automatically implement one or more recommendations made by the pricing optimizer—for example, instead of or in addition to being notified regarding the recommendations. In one such embodiment, the customer may specify a set of resources, such as a set of reserved instances, for which the customer has approved automated recommendation-based actions. (The set of resources may be empty to begin with, i.e., in some cases the customer may utilize the resource manager to obtain all of its resource instances.) Subsequent to an indication of the opt in by the customer for such automated actions, when the resource manager receives a relevant recommendation generated by the pricing optimizer, at least a portion of the recommendation may be put into effect, e.g., without the customer having to take any additional action. For example, if the recommendation suggests that a particular resource reservation (e.g., a slot for a reserved instance) held by the customer should be listed for resale on a reservations reselling marketplace, the resource manager may list the resource instance or reservation on the marketplace. If and when the listed resource instance is resold (e.g., when a different customer reserves the listed instance), the instance may be removed from the marketplace listing and/or from the set of resources reserved for the customer. In some cases, other events may cause a change in the status of the listed resource instance—e.g., if the instance has been listed for a while and has not yet been resold or if the pricing optimizer generates a new recommendation suggesting that it is advisable to delist the instance from the marketplace (based on pricing changes or increased resource demand from the customer). If the recommendation generated by the pricing optimizer suggests that it is advisable to procure another instance for the customer (e.g., either as a cheaper substitute for a reservation that is being resold or simply because the customer's resource demand is growing), the resource manager may identify an appropriate instance and reserve it or allocate it for the customer's use. The newly reserved or procured instance may be selected from an availability zone or region suggested in the recommendation.

The resource manager responsible for automating reservation modifications and/or other actions in accordance with recommendations generated by the pricing optimizer may be responsible for several other related functions in some embodiments. For example, the resource manager may implement one or more programmatic interfaces (such as Web pages, APIs or command-line interfaces) allowing customers to opt in for the automated implementation of the optimizer's recommendations, as well as one or more of the programmatic interfaces similar to those described above implementing aspects of the pricing optimizer functionality. A programmatic interface allowing customers to specify budget constraints, availability zone preferences and the like, to be used by the pricing optimizer in generating recommendations may be implemented by the resource manager in one embodiment. In some implementations the resource manager may provide an interface that allows a customer to specify a schedule for automated reservation optimization attempts. The customer may also indicate a scheduling preference that allows the resource manager and the pricing optimizer to control when recommendations are generated and/or implemented in some implementations—i.e., a scheduling preference that provides full flexibility for the timing of recommendation generation and implementation. In some embodiments, the full flexibility option may represent the default behavior of the system, such that restrictions on the timing of the actions of the optimizer and the resource manager may only be imposed in response to specific demands from the customer. Scheduling preferences may be communicated to the pricing optimizer by the resource manager, and the recommendations may be generated in accordance with the preferences.

Operators of provider networks, such as those described above, may, in some embodiments, provide an infrastructure, such as time-based allocation service 180 depicted in FIG. 1 configured to provide customers with the ability to submit and manage requests for time-based instances. By providing customers with the ability to acquire such time-based instance "slices," the provider network may allocate unused time slices to other customers with different usage requirements and thus increase sales and utilization of the provider network's resource slots.

Some customers may have the capability of determining usage patterns for their resources and thus be in a position to determine the number and type of instance slices that they need. However, some customers may not have information to make such a determination, and the provider network may provide a recommendation based on past usage data and trends.

Customers may purchase such time-based instance slices in a plurality of geographic areas, such as availability zones, so that the customer's desired level of computing capacity can be provided in each area during each area's local peak time periods. Thus it can be said that a customer's peak capacity may "follow the sun" or follow peak usage time periods or expected peak usage as the earth revolves and peak time periods pass through geographic areas on a daily basis. It should be noted that other recurring time periods, such as weeks or months, can be implemented.

As a customer's time-based instance slices are about to complete in one area and begin in another area, the customer's time-based instance slices can be activated in a number of ways. For example, if the customer has time-based instance slices in multiple areas, when the time period for the customer's time-based instance slice in a first area elapses, another time-based instance slice can be launched in a second area. In some embodiments, the instance running in the first area may be migrated to the second area. In other embodiments, the instance in the first area may be terminated and another instance in the second area can be launched using an instance template used to launch the first instance. If a customer has time-based instance slices in only one area, then the customer's software and data that were loaded during a previous time-based instance slice can be automatically reloaded and launched when the next time-based instance slice begins.

In cases where a customer primarily runs software and does not need access to time sensitive data, there may not be any need to move data between areas with different time-based instance slices. In this case, data does not need to be moved or made available to the new time-based instance slice and computing capacity may be provided in the new time-based instance slice without transferring data from another time-based instance slice. The new time-based instance slice can be based on the customer's information, such as the customer's profile and/or preferences. In some embodiments, the new time-based instance slice may comprise an instance that is launched based on an instance template as discussed above. An instance template may be a basic unit of deployment for an instance and may define an instance image. The instance template for a customer may include the customer's preferences. The instance template may include, for example, an operating system (e.g., Linux, Unix, or Windows) and other software. The instance template may be stored in provider networks in different geographic areas so that new time-based instance slices may be launched using the instance templates.

If the customer has dependencies on certain data sets, the provider network may move the needed data across availability zones or geographic regions to the customer's other time-based instance slices. For example, a service may be provided to capture data at a specified time and copy the data to time-based instance slices in a specified destination region. The data can be moved automatically as a time-based instance slice ends and a new time-based instance slice begins or manually upon entry of a command by the customer or an administrator.

In some cases, customer computing resource usage may be different between different geographic areas. For example, a customer may experience more computing usage in North America and less usage in Asia. In this case, the customer may determine different expected capacities in each region and purchase different quantities of time-based instance slices in the different regions.

When a customer's time-based instance slice has completed during a particular time period, the time-based instance slice can be allocated to a different customer upon completion of the time-based instance slice. In this way, a particular instance may be allocated to different customers during the course of a 24-hour time period (or other time period provided by the provider network). In some cases, a customer may experience an unexpected spike in usage during a particular time-based instance slice that may exceed the number of time-based instance slices allocated to that customer during the usage spike. To account for such unexpected usage, in some embodiments reserve capacity may be provided using other available instances, such as spot or on-demand instances.

The time-based instance slices may be set at any increment of time, and in some embodiments the time-based instance slices may be set to portions of any recurring time period. For example, a time slice may be set at six hours, in which case four 6-hour time slices can be allocated during a 24-hour period. Other time slice periods can be implemented, such as 8-hour or 12-hour time slices, in which case three 8-hour time slices or two 12-hour time slices can be allocated during a 24-hour period, respectively. Other time slice periods can be used in various embodiments. For example, the provider network may allow customers to select a time slice period in one-hour blocks. Additionally, the provider network may offer time slices during different recurring time periods. For example, one-day time slices can be offered over a recurring period of a week.

In some embodiments, the customer may be provided with the option of converting any of the customer's allocated time-based instance slices to a regular (full-time) on-demand instance. This may be useful, for example, when a customer wants to continue use of a time-based instance slice and would like to continue use of the instance after completion of the time-slice period.

Figure 6:
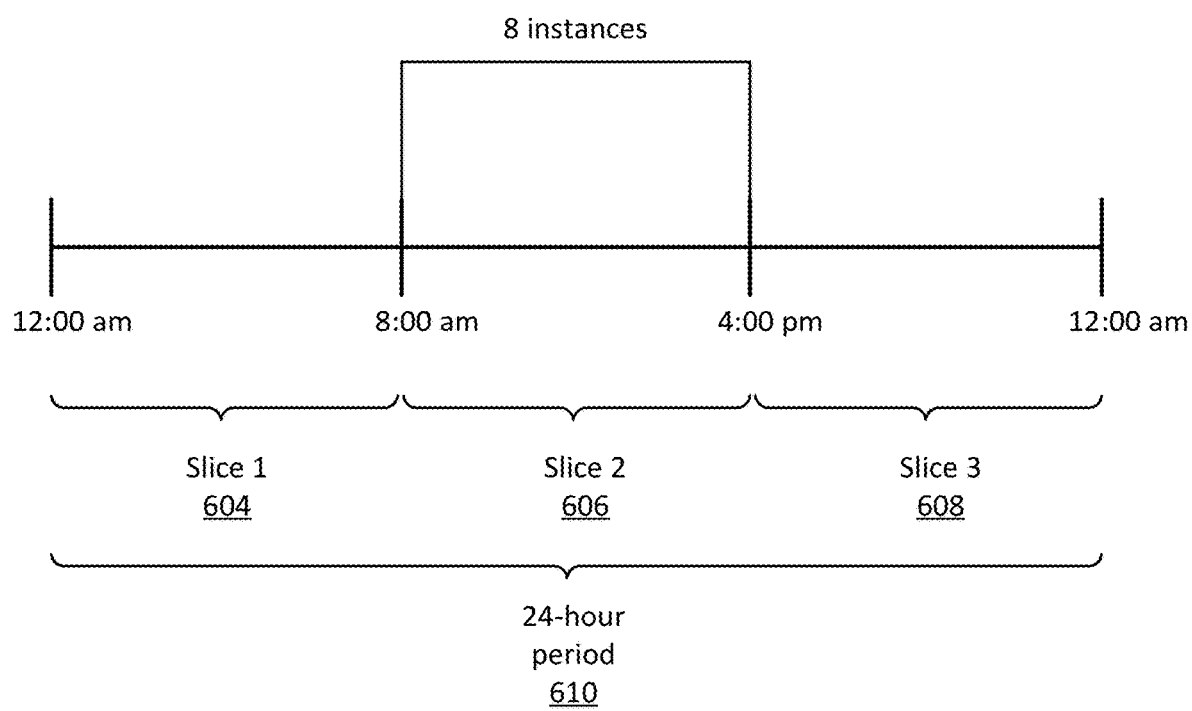
FIG. 6 is a diagram illustrating an example of time-based instances in accordance with the present disclosure.

Referring to FIG. 6, illustrated is an example of providing time-based instance slices in accordance with this disclosure. Referring to FIG. 6, a provider network may implement a 24-hour time period 610 during which instances may be provided on a time-sliced basis. In the example shown in FIG. 6, a provider network may provide three time slices—time slice 1 (604) that begins at 12:00 am and ends at 8:00 am; time slice 2 (606) that begins at 8:00 am and ends at 4:00 pm; and time slice 3 (608) that begins at 4:00 pm and ends at 12:00 am. As shown, a customer may be allocated eight time-based instance slices during the time slice 8:00 am to 4:00 pm. Since the time slice occurs over a 24-hour period, the customer's eight instances will be allocated every 24 hours over the same time slice (8:00 am to 4:00 pm).

Figure 7:
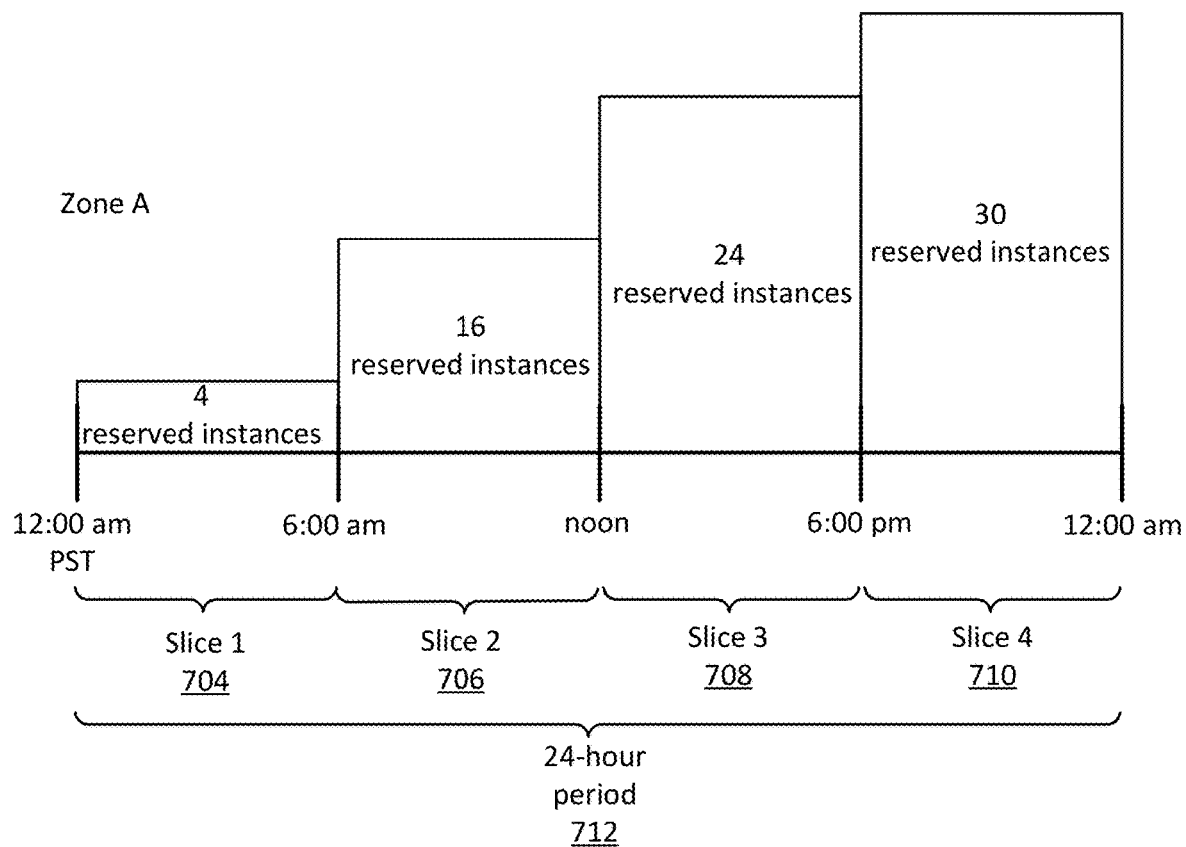
FIG. 7 is a diagram illustrating an example of time-based instances in accordance with the present disclosure.
Figure 7:
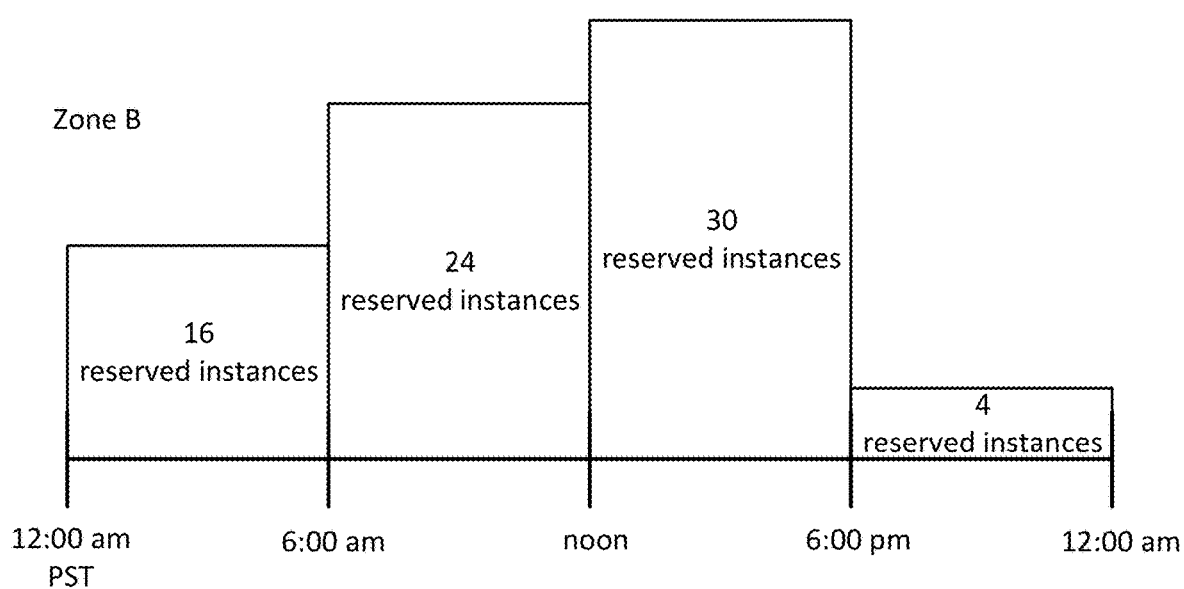

Referring to FIG. 7, illustrated is another example of providing time-based instance slices in accordance with this disclosure. Referring to FIG. 7, a customer may have reserved time-based instance slices in two different zones (for example, availability zones as discussed elsewhere in this disclosure). The provider network may implement a 24-hour time period 712 during which time-based instance slices may be provided on a time-sliced basis. Furthermore, a provider network may provide in this example four time slices—time slice 1 (704) that begins at 12:00 am and ends at 6:00 am; time slice 2 (706) that begins at 6:00 am and ends at noon; time slice 3 (708) that begins at noon and ends at 6:00 pm time; and slice 4 (710) that begins at 6:00 pm and ends at 12:00 am. As shown in Zone A, a customer may be allocated four instances during time slice 1 (704); 16 instances during time slice 2 (706); 24 instances during time slice 3 (708); and 30 instances during time slice 4 (710). Since the time slice occurs over a 24-hour period, the customer's instances will be allocated in this fashion every 24 hours. Over the same 24-hour time period in Zone B, the customer may have a different allocation. For illustrative purposes, both zones are shown using the same time zone, but it should be understood that Zone B can be in another time zone that is six hours ahead of Zone A. As shown in FIG. 7, in Zone B the customer may be allocated 16 instances during time slice 1 (704); 24 instances during time slice 2 (706); 30 instances during time slice 3 (708); and 4 instances during time slice 4 (710).

Figure 8:
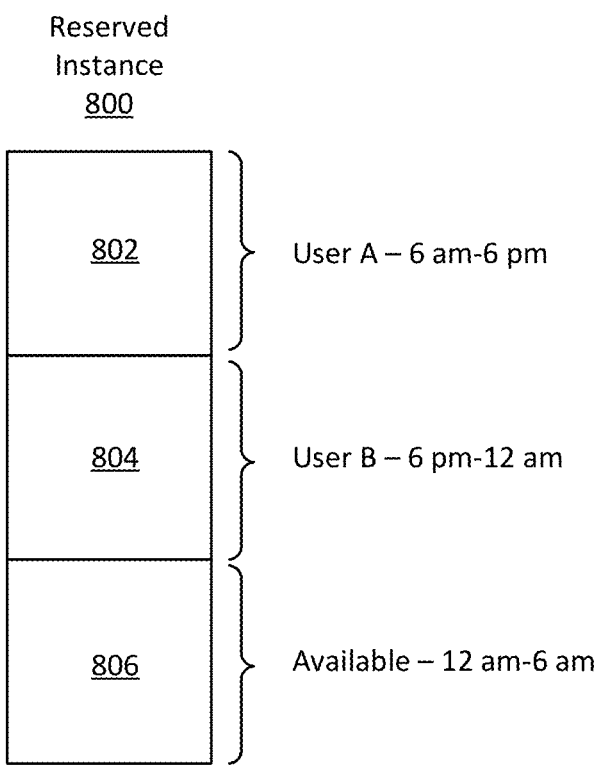
FIG. 8 is a diagram illustrating an example of time-based instances in accordance with the present disclosure.

Referring to FIG. 8, illustrated is an example of a single time-based instance slice in accordance with this disclosure. Referring to FIG. 8, a reserved instance 800 that is time sliced may be allocated to different customers during different time slices 802, 804 and 806. In this example, time slice 802 may be allocated to User A for the local time period 6 am to 6 pm. Time slice 804 may be allocated to User B for the local time period 6 pm to 12 am. Additionally, time slice 806, which includes the local time period 12 am to 6 am, may not be allocated to a user and thus may be available for purchase by another user.

The time-based allocation service 180 in FIG. 1 implemented by a provider network may include a time-based allocation analyzer. The time-based allocation analyzer may access data including a request for a recommendation for time-based instance slices. The time-based allocation analyzer may access usage data that may be provided by the customer or by the provider network. The time-based allocation analyzer may access one or more policies that may define additional objectives and policies for fulfilling the request. The time-based allocation analyzer may also access constraints provided by the customer for fulfilling the request, such as a maximum price that the customer is willing to pay. In one embodiment, the time-based allocation service 180 can be embodied in software that can be installed on a network of computers in the provider network.

Utilizing the technologies described above, a provider network may implement the time-based allocation service 180 to allow customers to request and acquire instances on a time-sliced basis. By providing such a time-based allocation service for requesting resources, the provider network can provide the requested resources by efficiently fulfilling the customer's request using available resources that meet the customer's requirements. This can allow the provider network to more efficiently allocate its resources while allowing the customer to more easily maximize their computing capacity and lower the prices that the customer pays for the computing capacity. Furthermore, the provider network may use the information from time-sliced instance usage to plan for future capacity.

In some embodiments, a pricing optimizer as described above may be used to evaluate a customer's usage and task completions and re-evaluate time-based instance slice allocations. Such a pricing optimizer can assess current and historical data for time-based usage and provide recommendations to the customer for lowering cost.

Figure 9:
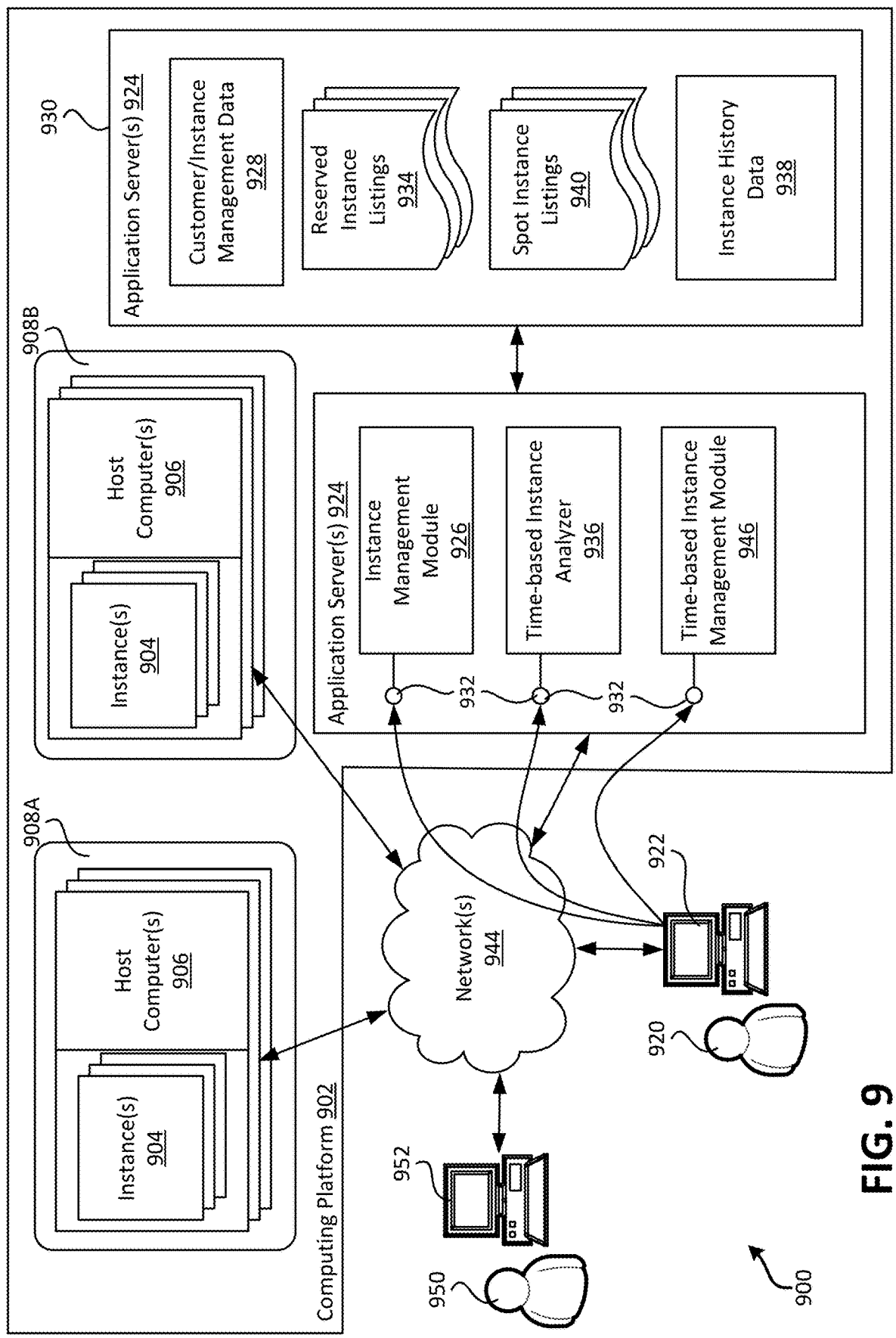
FIG. 9 is a diagram illustrating a system for time-based instances in accordance with the present disclosure.

FIG. 9 is a system diagram that shows an illustrative operating environment 900 including several components for implementing a time-based allocation service. The environment 900 may include a computing platform 902. The computing platform 902 may be implemented by a computing resource provider to make computing resources available to customers 920 for the deployment and execution of distributed applications.

The computing resources provided by the computing platform 902 may include various classes of resources, such as data processing resources, data storage resources, data communication resources and the like. Each class of computing resource may be general purpose or may be available in a number of specific configurations. For example, data processing resources provided by the computing resource provider may be made available in discrete units or instances 904. Each instance 904 may represent the data processing resources of a dedicated host computer 906, referred to herein as a dedicated tenancy instance, or each instance 904 may represent a virtual machine instance executing on a host computer 906, which may also be referred to as a shared tenancy instance.

The host computers 906 may represent generic multi-processor server devices, special purpose hardware devices and the like. As discussed above, various types and configurations of instances 904 may be made available. For example, each available instance 904 of data processing resources may be of a particular size—such as small, medium and large—representing different combinations of physical and/or virtual resources comprising or allocated to the instance, such as number and types of processors, amounts of memory, size and speed of local storage, number of networking addresses or communication channels and/or the like. An instance 904 may further be configured with a particular platform, such as a specific OS and/or hypervisor installed on the instance. Instances 904 may also be made available with specific application software components installed, such as Web server software, database management software, portal software, a specific runtime environment or platform and the like.

Instances may further be available in specific availability zones 908A and 908B, as described above. As discussed above, an availability zone 908 may represent a particular physical location, such as a data center or other physical and/or logical grouping of underlying host computers 906 and computing devices supporting the instances 904 provided by the computing platform 902. Providing instances 904 in different sizes and in different availability zones 908 may allow a deployed application to be geographically dispersed, improving end-user performance and insulating the overall application from failures in one particular location or zone. For example, a customer 920 may choose to deploy a number of small instances 904 across multiple availability zones 908 for some functions of the application, such as Web servers, while deploying a single large instance 904 for other functions, such as a database server, for example. The customer 920 may also require that instances 904 be hosted by host computers 906 in particular geographical locations for geopolitical reasons as well.

End-users 950 may utilize end-user computer systems 952 to access the functionality of the application executing on the allocated instances 904 through one or more networks 944. The network(s) 944 may represent a combination of local-area networks (LANs), wide-area networks (WANs), the Internet and/or any other networking infrastructure known in the art that connects the host computers 906 in the computing platform 902 to the end-user computer systems 952, to each other and to other computing resources. The end-user computer systems 952 may represent personal computers (PCs), desktop workstations, laptops, notebooks, personal digital assistants (PDAs), electronic-book readers, game consoles, set-top boxes, consumer electronics devices, server computers or any other computing device capable of connecting to the network(s) 944 and communicating with the host computers 906 in the computing platform 902.

A customer 920 wishing to access resources on the computing platform 902 may similarly utilize a customer computer system 922 to connect the computing platform over the network(s) 944 and to configure and manage the computing resources provided by the computing platform. In this regard, the computing platform 902 may include a number of application servers 924 that provide various management services to the customer 920 for purchasing and maintaining instances 904 of data processing and/or other computing resources, deploying components of the application across the purchased instances 904, monitoring and administering execution of the application and the like. As in the case of the end-user computer systems 952, the customer computer systems 922 may represent PCs, desktop workstations, laptops, notebooks, PDAs, electronic-book readers, game consoles, set-top boxes, consumer electronics devices, server computers or any other computing device capable of connecting to the network(s) 944 and communicating with the application servers 924 in the computing platform 902.

The application servers 924 may represent standard server computers, database servers, Web servers, network appliances, desktop computers, other computing devices and any combination thereof. The application servers 924 may execute a number of modules in order to provide the management services. The modules may execute on a single application server 924 or in parallel across multiple application servers in the computing platform 902. In addition, each module may consist of a number of subcomponents executing on different application servers 924 or other computing devices in the computing platform 902. The modules may be implemented as software, hardware or any combination of the two.

The application servers 924 may execute an instance management module 926. The instance management module 926 may allow customers 920 to purchase and configure instances 904 of data processing or other computing resources, manage and maintain purchased instances 904 and the like. Instances 904 may include instances that may be obtained through various modes, such as reserved instances, spot instances, and on demand instances as described above. Purchased instances 904 for each customer 920 and corresponding configuration and status information may be stored in customer/instance management data 928. The customer/instance management data 928 may be stored in a database 930 or other data storage system available to the application server(s) 924 in the computing platform 902.

As described above, reserved instances provide the customer with the ability to reserve a number of a specific type and configuration of instances for a term, such as one year or three years. The reserved instances may represent actual instances of data processing resources configured as specified and placed in stand-by for launch and deployment by the customer 920 at a future time, or the reserved instances 904 may represent overall capacity reserved by the computing resource provider for quick configuration and launch when required. When deploying an application, a customer 920 may purchase and launch a number of on-demand instances 904 of a specific type and configuration (e.g., size, platform, tenancy, availability zone and the like) to support immediate availability of the application, as well as a number of reserved instances of the same or similar type and configuration for scaling up the application in the future in response to increased demand or capacity requirements of the application, for example.

A customer 920 may utilize a Web browser application executing on the customer computer system 922 to access a user interface presented by the instance management module 926 through a Web service to perform the configuration and maintenance of their purchased instances 904. The customer 920 may also utilize a Web browser application executing on the customer computer system 922 to access a user interface presented by the time-based instance management module 946 through a Web service to purchase time-based instance slices as discussed above. Additionally or alternatively, the instance management module 926 and time-based instance management module 946 may expose an application programming interface (API) 932, which may be accessed over the network(s) 944 by stand-alone application programs executing on the customer computer system 922. Other mechanisms for accessing the configuration and maintenance services of the instance management module 926 or time-based instance management module 946 may also be imagined, including remote procedure calls, SOAP-based Web services, remote file access, proprietary client-server architectures and the like.

In some embodiments, the instance management module 926 may allow customers 920 to purchase both on-demand instances and reserved instances. On-demand instances may be purchased and launched immediately, allowing for quick deployment of the components of the application. On-demand instances may further be added or removed as needed, either manually or automatically through auto scaling, as demand for or capacity requirements of the application changes over time. The customer 920 may incur ongoing usage costs related to their on-demand instances, based on the number of hours of operation of the instances 904 and/or the actual resources utilized, for example.

A customer 920 may determine that in addition to their purchased instances 904, the customer 920 may want to purchase time-based computing capacity at a desired rate. For example, the computation needs of the customer 920 may be predictable over a 24-hour span and the customer may wish to acquire time-based computing capacity to fulfill the time-based computation needs at a not-to-exceed price. The customer 920 may submit a request that includes one or more parameters sufficient for time-based instance analyzer 936 to determine an estimated quantity or quantities and type(s) of time-based instance slice that will fulfill the customer's time-based computation needs.

The time-based instance analyzer 936 may access the reserved instance listings 934 and spot instance listings 940 in the database 930 to determine availability and pricing data for the estimated quantity and type(s) of instance that will fulfill the customer's computation needs. The reserved instance listings 934 may include listings for served instance listings 934. For example, time-based instance analyzer 936 may determine instance type and configuration requirements (e.g., size, platform, tenancy, availability zone and the like). Additionally, a separate set of listings for time-based instance slices may be maintained.

The application servers 924 may execute a time-based instance management module 946. The time-based instance management module 946 may facilitate the allocation of the time-based instance slices determined by time-based instance analyzer 936. The time-based instance management module 946 may allow also customer 920 to view status of the customer's requests. The customer 920 may utilize a Web browser application executing on the customer computer system 922 to access a user interfaces (UI) presented by the time-based instance management module 946 through a Web service to browse for pending requests and make changes. Additionally or alternatively, the time-based instance management module 946 may expose an API 932, which may be accessed over the network(s) 944 by stand-alone application programs executing on the customer computer system 922.

The time-based instance management module 946 may further store data records regarding submitted and fulfilled requests in the instance history data 938 in the database 930 or other data storage system. The options history data 938 may be utilized by customer 920 or the computing resource provider to record billing data regarding fulfilled bids.

As discussed, the user can be provided a user interface for submitting a time-based instance slice request. For example, the user may be able to access a user interface, such as the one shown in FIG. 10. In one embodiment, a customer may utilize a user interface presented by the time-based instance management module 946 of FIG. 9 to submit a request for time-based instance slices. For example, as shown in FIG. 9, the time-based instance management module 946 or another module in the computing platform 902 may present a user interface (UI) 1000 to the customer 920 in a window 1002 of a Web browser or other client application executing on the customer computer system 922. The UI 1000 may include a time-sliced reserved instance list 1004 listing the time-sliced reserved instances currently owned by the customer 920, including the frequency and start/stop times of each and other parameters such as the availability zone, platform, size, region, and the like. The time-sliced reserved instance list 1004 may also include the current state of the time-sliced reserved instances, such as whether the time-sliced reserved instances are active or expired. The user interface 1000 may also provide typical or average prices that may be relevant to the customer's request. Based on the customer's currently entered parameters, the user interface 1000 may provide an estimated current price range for fulfilling the customer's request based on currently entered parameters and currently available prices. These fields are provided to illustrate examples of possible user interface options that may be provided to a customer. As further described herein, additional fields may be provided, and some of the fields may be optional.

Figure 10:
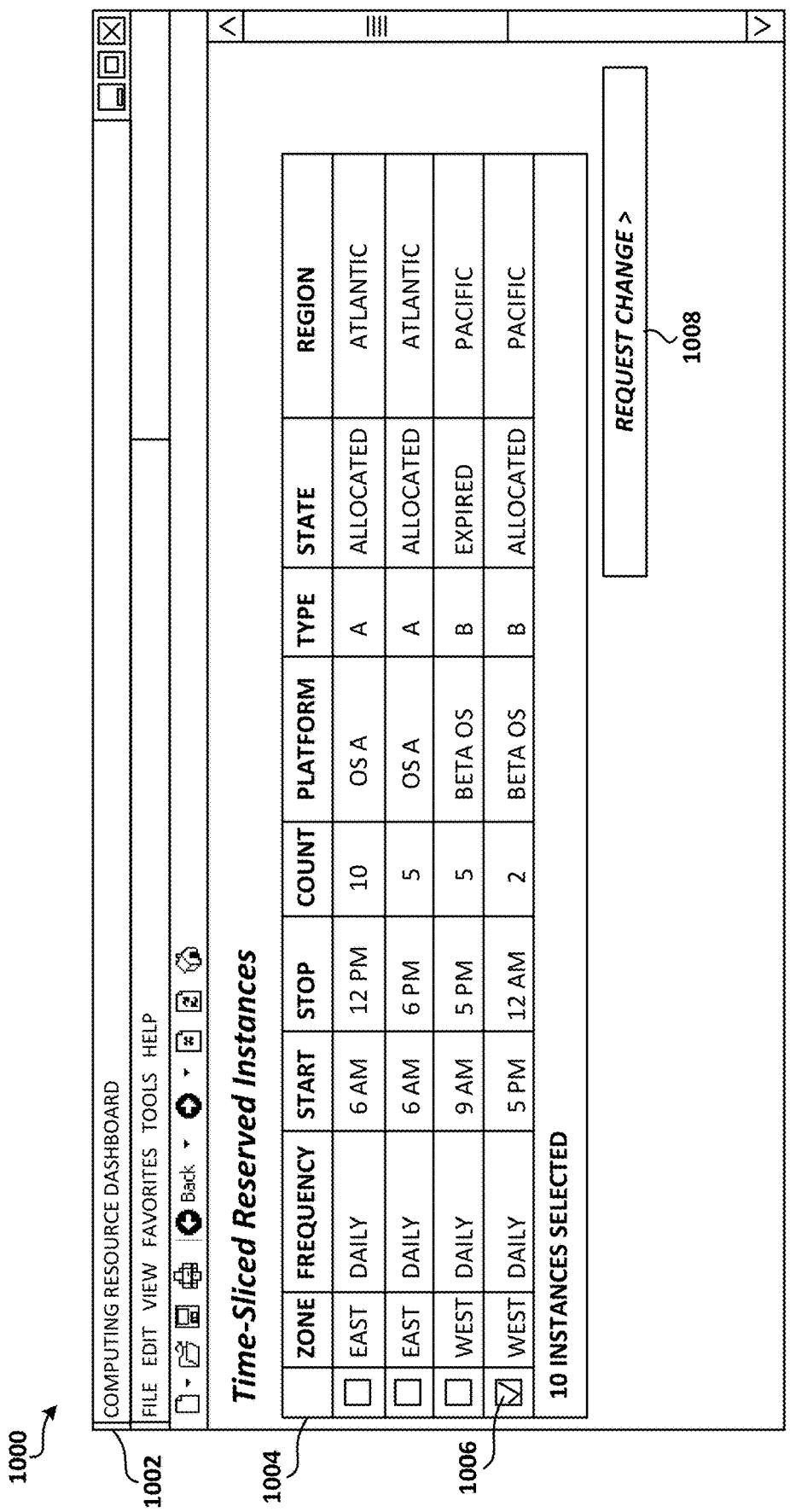
FIG. 10 is a diagram illustrating an example user interface in accordance with the present disclosure.

The UI 100 may further include a selection UI control, such as the checkbox UI control 1006 shown in FIG. 10, that allows the customer 920 to select one or more time-sliced reserved instances or instance groups shown in the reserved instance list 1004, after which the customer 920 may select a command UI control, such as the Request Change UI control 1008 shown in FIG. 10. Other methods of selecting time-sliced reserved instances 904 for listing in the reserved instance marketplace through the UI 1000 may also be implemented, including selecting a line in the reserved instance list 1004 with a mouse or other input control and selecting a command UI control from a context menu presented by the instance management module 926 for the selected line, for example.

After selection of a control to submit a time-based instance slice, time-based instance analyzer 936 may receive information for the parameters for the time-based instance slice request.

In some embodiments, an API or a programming interface sub-system may be provided for facilitating the submission of time-based instance slice requests. The API may be configured to receive electronic messages that encode identifiers indicative of a time-based instance slice request for fulfillment by the provider network. In response to receiving one of the electronic messages, the API may send second electronic messages indicative of information indicating that a time-based instance slice request has been received or has been allocated to the customer. An API may also be provided that can facilitate exchange of data with applications that may provide information for submitting time-based instance slice requests. For example, an API may receive parameter data from third-party applications that may perform customer scheduling and task management functions.

Figure 11:
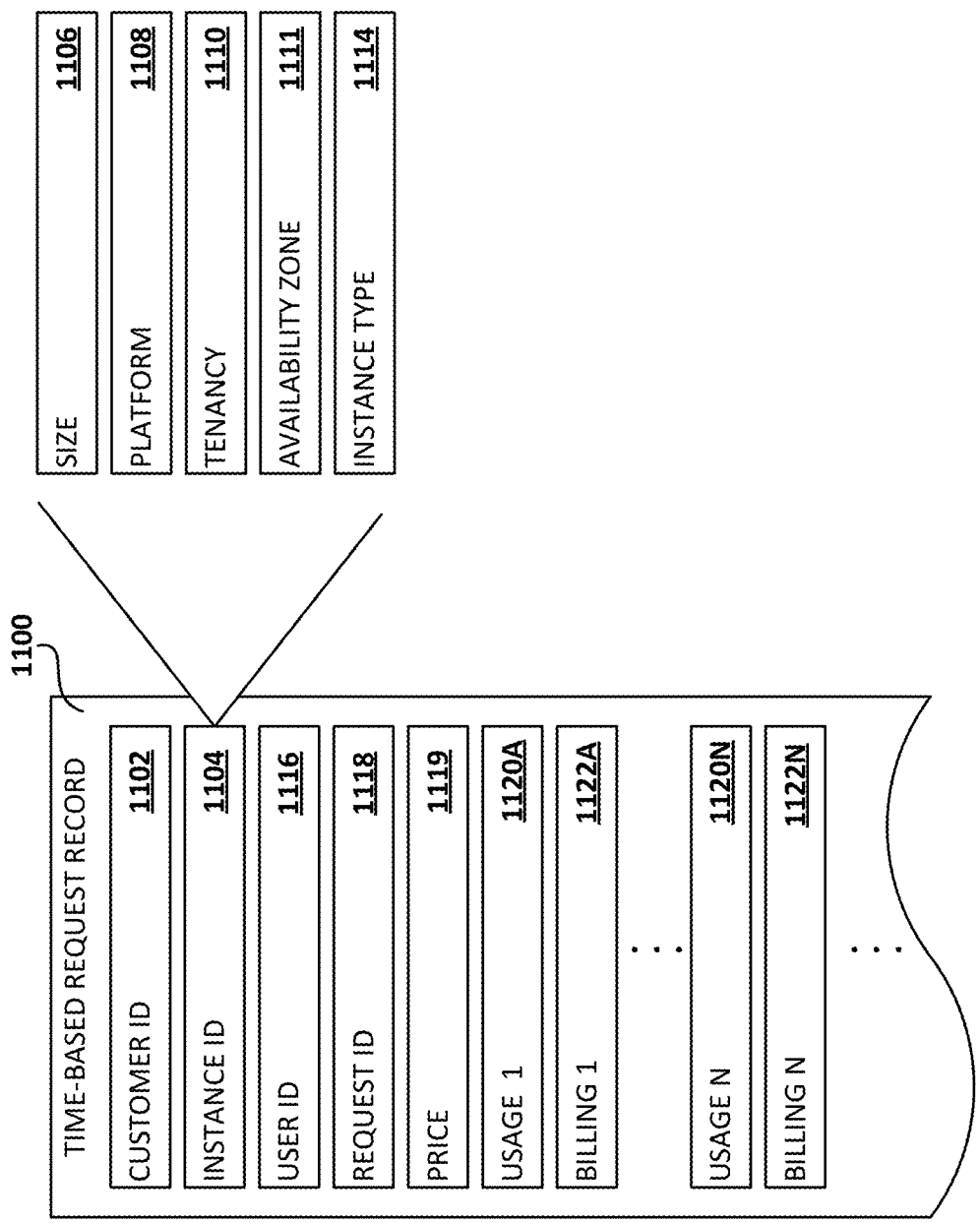
FIG. 11 is a diagram illustrating an example data record in accordance with the present disclosure.

FIG. 11 is a data structure diagram showing a number of data elements stored in a time-based request record 1100. It will be appreciated by one skilled in the art that the data structure shown in the figure may represent a data file, a database table, an object stored in a computer memory, a programmatic structure or any other data container commonly known in the art. Each data element included in the data structure may represent one or more fields in a data file, one or more columns of a database table, one or more attributes of an object, one or more member variables of a programmatic structure or any other unit of data of a data structure commonly known in the art. The implementation is a matter of choice and may depend on the technology, performance and other requirements of the computing system upon which the data structures are implemented.

The time-based request record 1100 may contain a customer ID 1102 identifying the customer 920 of the computing platform 902 that has submitted the request. According to one embodiment, the time-based request record 1100 may also contain an instance ID 1104 field identifying one or more specific instances that may be associated with a time-based instance slice request. The instance ID 1104 may correspond to information regarding the instances stored in the customer/instance management data 928, for example.

In some embodiments, the time-based request record 1100 may additionally or alternatively contain information regarding the type and configuration parameters describing the associated instance(s) 1104, including the size 1106, platform 1108, tenancy 1110, availability zone 1111, instance type 1114 and the like. The time-based request record 1100 may include multiple entries or pointers to other records in the case of multiple instances. The time-based request record 1100 may also contain a user ID 1116 indicating an identification of a particular user associated with the record. The user ID 1116 may correspond to the identifier information provided by the customer 920 when creating the time-based instance slice request, as described above with regard to FIG. 10.

The time-based request record 1100 may also contain information regarding a request ID 1118 corresponding to the time-based instance slice request and asking price 1119 that corresponds to the maximum amount that the customer wants to pay for the request. The time-based request record 1100 may further contain information regarding one or more usage records 1120A-1120N (also referred to herein generally as "usage 1120") and billing records 1122A-1122N (also referred to herein generally as "billing 1122"). As further discussed above in regard to FIG. 10, a user may access a time-based instance slice request after successfully obtaining fulfilling of the request. Billing records 1122A-1122N for usage 1120A-1102N may be tracked for the customer for billing purposes. It will be appreciated that the time-based request record 1100 may contain additional data elements beyond those shown in FIG. 11 and described above that are utilized by the instance management module 926, the time-based instance analyzer module 936 and/or other modules of the computing platform 902 implementing the private marketplace.

In additional embodiments, the instance management module 926 or other modules in the computing platform 902 may provide user interfaces or APIs 932 to the customer 920 and/or customer computer system 922 that allow the customer to modify their time-based instance slice request, check the status of the time-based instance slice request record and/or to delete the time-based instance slice request record if it is no longer desired to provide the computing capacity using the time-based allocation service.

Figure 12:
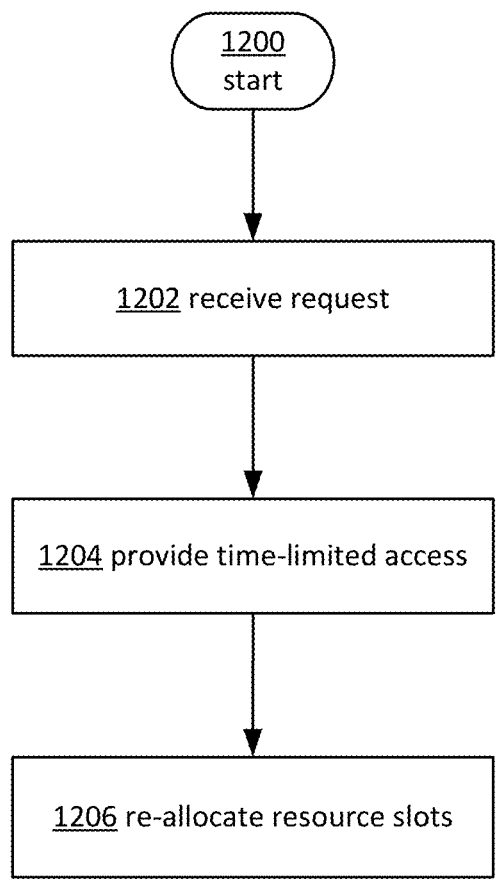
FIG. 12 is a flowchart depicting an example procedure for time-based instances in accordance with the present disclosure.

FIG. 12 illustrates an example operational procedure for allocating computing resources to entities in units of computing instances. In an embodiment, a mechanism for allocating computing resources can be provided by services, such as time-based allocation service 180 in FIG. 1. The operational procedure may be implemented in a system comprising one or more computing devices. In one embodiment, the system may comprise a data center. The one or more computing devices may comprise a plurality of resource slots, each resource slot configured to host a computing instance. Referring to FIG. 12, operation 1200 begins the operational procedure. Operation 1200 may be followed by operation 1202. Operation 1202 illustrates receiving, from one of a plurality of entities, a request for one or more computing instances.

Operation 1202 may be followed by operation 1204. Operation 1204 illustrates providing time-limited access to the requested one or more computing instances. In one embodiment, the time-limited access may correspond to a time slice as discussed above, and the time-limited access may correspond to time-based instance slices as described above. In an embodiment, the time-limited access may be a fixed portion of a recurring time period. Furthermore, the time-limited access may be determined based at least in part on a geographic area associated with the requested computing instances.

In some embodiments, the recurring time period may be a 24-hour time period and the fixed portion may be a portion of the 24-hour time period. Furthermore, the time-limited access may be based at least in part on time-based usage data for the requested computing instances.

Operation 1204 may be followed by operation 1206. Operation 1206 illustrates re-allocating one or more resource slots used to host the one or more computing instances to other ones of the plurality of entities during other portions of the recurring time period.

Each of the processes, methods and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A system for allocating computing resource slots configured to host computing instances, comprising:
at least one memory having stored therein computer instruction that upon execution by one or more processors of the system, at least cause the system to:
receive from one of a plurality of entities, a request for a computing instance associated with the entity to be hosted in a resource source slot among a plurality of resource slots;
provide access to the requested computing instance during a fixed portion of a recurring time period, wherein the fixed portion of the recurring time period is determined based at least in part on a geographic region in which the resource slot is located; and
allocate the resource slot to one or more other computing instances associated with other entities during portions of the recurring time period other than the fixed portion.

2. The system according to claim 1, wherein the recurring time period is a 24-hour time period and the fixed portion is a portion of the 24-hour time period.

3. The system according to claim 1, wherein the access provided is based at least in part on time-based usage data for the requested one or more computing instances.

4. The system according to claim 1, wherein the request comprises a quantity and type of computing instance.

5. In a computing environment comprising a plurality of computing devices having capacity logically segmented into one or more resource slots, wherein the resource slots are configured to be sharable among one or more of a plurality of entities and associated with one or more of the plurality of entities, a method comprising:
receiving from one of a plurality of entities, a request for a computing instance associated with the entity to be hosted in a resource source slot among a plurality of resource slots;
providing access to the requested computing instance during a fixed portion of a recurring time period, wherein the fixed portion of the recurring time period is determined based at least in part on a geographic region in which the resource slot is located; and
allocating the resource slot to one or more other computing instances associated with other entities during portions of the recurring time period other than the fixed portion.

6. The method of claim 5, wherein the request comprises a quantity and type of computing instance.

7. The method of claim 5, wherein the recurring time period is a 24-hour time period and the portion is a portion of the 24-hour time period.

8. The method of claim 5, wherein the fixed portion of the recurring time period is based at least in part on time-based usage data for the requested computing resources.

9. The method of claim 5, wherein the fixed portion of the recurring time period is based at least in part on a geographic area associated with the requested computing resources.

10. The method of claim 9, wherein the fixed portion of the recurring time period is based at least in part on one or more availability zones associated with the geographic area associated with the requested computing resources.

11. The method of claim 9, wherein the fixed portion of the recurring time period is based at least in part on expected peak usage of the requested computing resources within one or more time zones associated with the geographic area.

12. The method of claim 5, wherein software and data associated with the requested computing resources are loaded prior to start of the portion of the recurring time period.

13. The method of claim 5, further comprising migrating data for one or more instances running in the one or more of the resource slots to one or more second resource slots in another time zone after the portion of the recurring time period elapses.

14. The method of claim 5, further comprising terminating one or more instances running in the one or more of the resource slots after the portion of the recurring time period elapses, wherein one or more new instances are launched in one or more second resource slots in a second time zone.

15. A non-transitory computer-readable storage medium having stored thereon computer-readable instructions, the computer-readable instructions comprising instructions that upon execution on one or more computing devices, at least cause the one or more computing devices to:
generate a first user interface allowing an entity of a plurality of entities to submit a request for computing instances and a recurring time period for providing the requested computing instances, the recurring time period determined based at least in part on a plurality of geographic areas;
allocating a first computing instance to the entity of the plurality of entities during the recurring time period;
make computing resources used to host the first computing instance available to other entities of the plurality of entities during the recurring time period when the first computing instance is not allocated to the entity of the plurality of entities; and
launching a second computing instance in a second geographic area when the first computing instance is not allocated to the entity of the plurality of entities.

16. The non-transitory computer-readable medium of claim 15, further comprising instructions that upon execution on one or more computing devices, at least cause the one or more computing devices to generate a second user interface allowing the entity to receive a status of the request and submit changes to the request.

17. The non-transitory computer-readable medium of claim 15, wherein the first user interface is an application programming interface configured to:
receive first electronic messages that encode identifiers indicative of the request; and
in response to receiving one of the first electronic messages, send second electronic messages indicative of information pertaining to a current status of the request.

18. The non-transitory computer-readable medium of claim 15, wherein the allocating the first computing instance to the entity is based at least in part on one or more availability zones associated with the geographic area associated with the requested computing resources.

19. The non-transitory computer-readable medium of claim 15, wherein the allocating the first computing instance to the entity is based at least in part on expected peak usage of the requested computing resources within one or more time zones associated with the geographic area.

20. The non-transitory computer-readable medium of claim 15, further comprising instructions that upon execution on one or more computing devices, at least cause the one or more computing devices to terminate one or more instances running in the one or more of the resource slots after a portion of the recurring time period elapses, wherein one or more new instances are launched in one or more second resource slots in a second time zone.

\* \* \* \* \*